(12) United States Patent
Hewatt

(10) Patent No.: US 7,832,297 B2
(45) Date of Patent: Nov. 16, 2010

(54) METHOD AND APPARATUS FOR GYROSCOPIC PROPULSION

(76) Inventor: Chris B. Hewatt, 11211 E. Arapahoe Rd., Suite 215, Centennial, CO (US) 80112

( * ) Notice: Subject to any disclaimer, the term of this patent is extended or adjusted under 35 U.S.C. 154(b) by 929 days.

(21) Appl. No.: 11/394,401

(22) Filed: Mar. 31, 2006

(65) Prior Publication Data

US 2006/0230847 A1    Oct. 19, 2006

Related U.S. Application Data

(60) Provisional application No. 60/673,011, filed on Apr. 19, 2005, provisional application No. 60/689,595, filed on Jun. 9, 2005.

(51) Int. Cl.
G01C 19/02 (2006.01)
(52) U.S. Cl. .......................... 74/5.12; 74/5.37
(58) Field of Classification Search .................. 74/5.12, 74/5.37, 84 S
See application file for complete search history.

(56) References Cited

U.S. PATENT DOCUMENTS

| | | | |
|---|---|---|---|
| 1,544,834 A | 7/1925 | Gooder | |
| 2,031,286 A | 2/1933 | Stern et al. | |
| 2,183,460 A | 12/1939 | Lenox | |
| 2,296,654 A | 9/1942 | Stein et al. | |
| 2,390,341 A | 12/1945 | Williams | |
| 2,811,050 A | 10/1957 | Prichard | |
| 2,960,889 A | 11/1960 | Keyser | |
| 3,153,353 A | 10/1964 | Voigt | |
| 3,203,644 A | 8/1965 | Kellogg, Jr. | |
| 3,633,849 A * | 1/1972 | Kling | 244/12.2 |
| 3,673,875 A | 7/1972 | Kasselmann | |
| 3,756,337 A | 9/1973 | Schroeder et al. | |
| 3,756,338 A | 9/1973 | Goodridge | |
| 3,769,845 A | 11/1973 | Nocek | |
| 3,807,244 A | 4/1974 | Estrade | |
| 3,810,394 A | 5/1974 | Novak | |
| 3,863,510 A | 2/1975 | Benson | |
| 3,889,543 A | 6/1975 | Mast | |

(Continued)

FOREIGN PATENT DOCUMENTS

FR    918598    2/1947

(Continued)

OTHER PUBLICATIONS

International Search Report for International (PCT) Application No. PCT/US06/12900, mailed Mar. 4, 2008.

(Continued)

*Primary Examiner*—Sherry L Estremsky
*Assistant Examiner*—Edwin A. Young
(74) *Attorney, Agent, or Firm*—Sheridan Ross P.C.

(57) ABSTRACT

A propulsion system includes an engine and a rotating member rotatably engaging the engine. The rotating member comprises a plurality of drive members positioned around the circumference of the rotating member. Each of the drive members has an unlocked state in which the drive members apply substantially no torque to the rotating member, and a locked state, in which the drive members apply substantially a torque to the rotating member. At a selected time, a first set of the drive members are in the unlocked state and a second set of the drive members are in the locked state to provide a propulsive force.

27 Claims, 8 Drawing Sheets

U.S. PATENT DOCUMENTS

| | | |
|---|---|---|
| 3,897,692 A | 8/1975 | Lehberger |
| 3,916,704 A | 11/1975 | Gaberson |
| 3,968,700 A | 7/1976 | Cuff |
| 3,979,961 A | 9/1976 | Schnur |
| 3,998,107 A | 12/1976 | Cuff |
| 4,087,064 A | 5/1978 | Knap |
| 4,095,460 A | 6/1978 | Cuff |
| 4,161,889 A | 7/1979 | Hinds |
| 4,169,391 A | 10/1979 | Schonberger |
| 4,238,968 A | 12/1980 | Cook |
| 4,242,918 A | 1/1981 | Srogi |
| 4,261,212 A | 4/1981 | Melnick |
| 4,295,381 A | 10/1981 | Hinds |
| 4,347,752 A | 9/1982 | Dehen |
| 4,361,055 A | 11/1982 | Kinson |
| 4,398,431 A | 8/1983 | Melnick |
| 4,408,740 A | 10/1983 | Kleber |
| 4,409,856 A | 10/1983 | de Weaver, III |
| 4,450,141 A | 5/1984 | Linde |
| 4,479,396 A | 10/1984 | de Weaver, III |
| 4,498,015 A | 2/1985 | Gottfried |
| 4,525,160 A | 6/1985 | Okawa et al. |
| 4,539,810 A | 9/1985 | Watanabe |
| 4,546,673 A | 10/1985 | Shigematsu et al. |
| 4,551,119 A | 11/1985 | Sugaya et al. |
| 4,561,327 A | 12/1985 | Niwa et al. |
| 4,565,110 A | 1/1986 | Ito |
| 4,569,254 A | 2/1986 | Itoh et al. |
| 4,577,520 A | 3/1986 | Colla |
| 4,579,011 A | 4/1986 | Dobos |
| 4,579,549 A | 4/1986 | Okawa et al. |
| 4,584,907 A | 4/1986 | Niwa et al. |
| 4,593,582 A | 6/1986 | Sawada et al. |
| 4,594,916 A | 6/1986 | Ito et al. |
| 4,595,386 A | 6/1986 | Okawa et al. |
| 4,596,536 A | 6/1986 | Okawa et al. |
| 4,601,680 A | 7/1986 | Tokoro et al. |
| 4,606,446 A | 8/1986 | Watanabe |
| 4,618,022 A | 10/1986 | Hayashi |
| 4,618,337 A | 10/1986 | Okawa et al. |
| 4,619,629 A | 10/1986 | Shigematsu et al. |
| 4,619,634 A | 10/1986 | Nakawaki |
| 4,622,865 A | 11/1986 | Itoh et al. |
| 4,623,052 A | 11/1986 | Watanabe et al. |
| 4,624,153 A | 11/1986 | Itoh et al. |
| 4,624,349 A | 11/1986 | Watanabe |
| 4,628,773 A | 12/1986 | Itoh et al. |
| 4,631,043 A | 12/1986 | Tokoro et al. |
| 4,631,971 A | 12/1986 | Thornson |
| 4,637,279 A | 1/1987 | Itoh et al. |
| 4,641,550 A | 2/1987 | Meyman |
| 4,642,068 A | 2/1987 | Osanai et al. |
| 4,642,069 A | 2/1987 | Sawada et al. |
| 4,644,821 A | 2/1987 | Sumiyoshi et al. |
| 4,645,477 A | 2/1987 | Okawa et al. |
| 4,649,485 A | 3/1987 | Osanai et al. |
| 4,649,487 A | 3/1987 | Osanai et al. |
| 4,649,488 A | 3/1987 | Osanai et al. |
| 4,653,004 A | 3/1987 | Osanai et al. |
| 4,653,005 A | 3/1987 | Osanai et al. |
| 4,653,006 A | 3/1987 | Osanai et al. |
| 4,653,007 A | 3/1987 | Osanai et al. |
| 4,653,353 A | 3/1987 | Itoh et al. |
| 4,655,734 A | 4/1987 | Okawa et al. |
| 4,656,587 A | 4/1987 | Osanai et al. |
| 4,658,360 A | 4/1987 | Osanai et al. |
| 4,660,438 A | 4/1987 | Tatara et al. |
| 4,663,932 A | 5/1987 | Cox |
| 4,663,990 A | 5/1987 | Itoh et al. |
| 4,669,336 A | 6/1987 | Okada et al. |
| 4,672,863 A | 6/1987 | Itoh et al. |
| 4,673,378 A | 6/1987 | Tokoro et al. |
| 4,674,583 A | 6/1987 | Peppiatt et al. |
| 4,682,518 A | 7/1987 | Takada et al. |
| 4,683,779 A | 8/1987 | Osanai et al. |
| 4,685,357 A | 8/1987 | Sawada et al. |
| 4,685,358 A | 8/1987 | Itoh |
| 4,689,745 A | 8/1987 | Itoh et al. |
| 4,698,764 A | 10/1987 | Inagaki et al. |
| 4,701,853 A | 10/1987 | Osanai |
| 4,702,725 A | 10/1987 | Kouno et al. |
| 4,704,683 A | 11/1987 | Osanai |
| 4,712,439 A | 12/1987 | North |
| 4,715,258 A | 12/1987 | Shigematsu et al. |
| 4,716,790 A | 1/1988 | Sawada et al. |
| 4,718,306 A | 1/1988 | Shigematsu et al. |
| 4,720,793 A | 1/1988 | Watanabe et al. |
| 4,726,241 A | 2/1988 | Melnick |
| 4,727,490 A | 2/1988 | Narita et al. |
| 4,727,771 A | 3/1988 | Niwa et al. |
| 4,735,112 A | 4/1988 | Osanai et al. |
| 4,736,301 A | 4/1988 | Osanai |
| 4,739,678 A | 4/1988 | Miura et al. |
| 4,743,223 A | 5/1988 | Tokoro et al. |
| 4,744,259 A | 5/1988 | Peterson |
| 4,747,327 A | 5/1988 | Itoh et al. |
| 4,751,859 A | 6/1988 | Itoh et al. |
| 4,753,133 A | 6/1988 | Itoh et al. |
| 4,767,388 A | 8/1988 | Tatara et al. |
| 4,770,063 A | 9/1988 | Mundo |
| 4,771,656 A | 9/1988 | Itoh et al. |
| 4,772,249 A | 9/1988 | Kouno et al. |
| 4,778,435 A | 10/1988 | Sugaya et al. |
| 4,784,006 A | 11/1988 | Kethley |
| 4,784,018 A | 11/1988 | Okada et al. |
| 4,788,882 A | 12/1988 | Fulop |
| 4,790,214 A | 12/1988 | Hattori et al. |
| 4,791,815 A | 12/1988 | Yamaguchi et al. |
| 4,793,209 A | 12/1988 | Morisawa |
| 4,793,217 A | 12/1988 | Morisawa et al. |
| 4,795,409 A | 1/1989 | Okuwaki et al. |
| 4,801,111 A | 1/1989 | Rogers et al. |
| 4,803,628 A | 2/1989 | Hayashi et al. |
| 4,811,222 A | 3/1989 | Watanabe et al. |
| 4,817,469 A | 4/1989 | Shigematsu et al. |
| 4,836,056 A | 6/1989 | Nakawaki et al. |
| 4,856,358 A | 8/1989 | Montalbano |
| 4,857,034 A | 8/1989 | Kouno et al. |
| 4,858,496 A | 8/1989 | Iwatsuki et al. |
| 4,860,863 A | 8/1989 | Hayashi |
| 4,867,287 A | 9/1989 | Hayashi |
| 4,867,732 A | 9/1989 | Soga et al. |
| 4,871,344 A | 10/1989 | Morisawa |
| 4,872,115 A | 10/1989 | Itoh et al. |
| 4,879,918 A | 11/1989 | Hojo et al. |
| 4,884,465 A | 12/1989 | Zachystal |
| 4,884,653 A | 12/1989 | Kouno |
| 4,891,600 A | 1/1990 | Cox |
| 4,898,567 A | 2/1990 | Tatara et al. |
| 4,942,950 A | 7/1990 | Watanabe et al. |
| 4,945,482 A | 7/1990 | Nishikawa et al. |
| 4,945,483 A | 7/1990 | Tokoro |
| 4,950,213 A | 8/1990 | Morisawa |
| 4,955,852 A | 9/1990 | Morisawa |
| 4,957,282 A | 9/1990 | Wakefield |
| 4,967,621 A | 11/1990 | Soga et al. |
| 4,967,983 A | 11/1990 | Motts |
| 4,969,545 A | 11/1990 | Hayashi |
| 4,987,967 A | 1/1991 | Kouno |
| 4,991,453 A | 2/1991 | Mason |
| 4,999,774 A | 3/1991 | Tokoro et al. |
| 5,005,444 A | 4/1991 | Kimura et al. |
| 5,006,093 A | 4/1991 | Itoh et al. |
| 5,021,958 A | 6/1991 | Tokoro |

| | | | | | |
|---|---|---|---|---|---|
| 5,024,112 A | 6/1991 | Kidd | 5,865,709 A | 2/1999 | Tamura et al. |
| 5,042,313 A | 8/1991 | Montalbano | 5,873,426 A | 2/1999 | Tabata et al. |
| 5,050,715 A | 9/1991 | Itoh et al. | 5,895,333 A | 4/1999 | Morisawa et al. |
| 5,052,247 A | 10/1991 | Kato et al. | 5,895,435 A | 4/1999 | Ohta et al. |
| 5,052,980 A | 10/1991 | Itoh et al. | 5,923,093 A | 7/1999 | Tabata et al. |
| 5,054,331 A | 10/1991 | Rodgers | 5,928,301 A | 7/1999 | Soga et al. |
| 5,063,816 A | 11/1991 | Soga et al. | 5,934,395 A | 8/1999 | Koide et al. |
| 5,067,603 A | 11/1991 | Kato et al. | 5,935,040 A | 8/1999 | Tabata et al. |
| 5,085,104 A | 2/1992 | Kouno et al. | 5,951,614 A | 9/1999 | Tabata et al. |
| 5,085,107 A | 2/1992 | Tatara | 5,982,045 A | 11/1999 | Tabata et al. |
| 5,086,672 A | 2/1992 | Kato et al. | 6,003,626 A | 12/1999 | Ibaraki et al. |
| 5,088,355 A | 2/1992 | Sugaya et al. | 6,053,841 A | 4/2000 | Koide et al. |
| 5,090,260 A | 2/1992 | Delroy | 6,059,064 A | 5/2000 | Nagano et al. |
| 5,094,129 A | 3/1992 | Sugaya et al. | 6,063,003 A | 5/2000 | Kubota et al. |
| 5,095,435 A | 3/1992 | Tokoro et al. | 6,066,070 A | 5/2000 | Ito et al. |
| 5,109,719 A | 5/1992 | Piokins, Jr. | 6,070,118 A | 5/2000 | Ohta et al. |
| 5,111,087 A | 5/1992 | Butka | 6,081,042 A | 6/2000 | Tabata et al. |
| 5,119,698 A | 6/1992 | Sugaya et al. | 6,092,633 A | 7/2000 | Morisawa |
| 5,133,515 A | 7/1992 | Strattan et al. | 6,093,974 A | 7/2000 | Tabata et al. |
| 5,133,517 A | 7/1992 | Ware | 6,098,733 A | 8/2000 | Ibaraki et al. |
| 5,136,495 A | 8/1992 | Tokoro et al. | 6,134,498 A | 10/2000 | Oba |
| 5,142,861 A | 9/1992 | Schlicher et al. | 6,155,364 A | 12/2000 | Nagano et al. |
| 5,150,626 A | 9/1992 | Navarro et al. | 6,182,000 B1 | 1/2001 | Ohta et al. |
| 5,156,058 A | 10/1992 | Bristow, Jr. | 6,199,001 B1 | 3/2001 | Ohta et al. |
| 5,157,992 A | 10/1992 | Hayashi et al. | 6,205,379 B1 | 3/2001 | Morisawa et al. |
| 5,167,163 A | 12/1992 | McMahon | 6,240,354 B1 | 5/2001 | Yamada et al. |
| 5,182,958 A | 2/1993 | Black | 6,306,057 B1 | 10/2001 | Morisawa et al. |
| 5,184,526 A | 2/1993 | Watanabe | 6,318,349 B1 | 11/2001 | Muto et al. |
| 5,188,007 A | 2/1993 | Hattori et al. | 6,327,922 B1 | 12/2001 | Hewatt |
| 5,197,279 A | 3/1993 | Taylor | 6,334,424 B1 | 1/2002 | Ito |
| 5,203,233 A | 4/1993 | Hattori et al. | 6,334,834 B1 | 1/2002 | Mizutani et al. |
| 5,207,617 A | 5/1993 | Kato et al. | 6,334,835 B1 | 1/2002 | Tanaka et al. |
| 5,211,006 A | 5/1993 | Sohnly | 6,344,008 B1 | 2/2002 | Nagano et al. |
| 5,211,083 A | 5/1993 | Hattori et al. | 6,345,221 B2 | 2/2002 | Hattori et al. |
| 5,243,868 A | 9/1993 | Schonberger | 6,352,491 B2 | 3/2002 | Mashiki et al. |
| 5,243,881 A | 9/1993 | Hayashi | 6,377,882 B1 | 4/2002 | Ito |
| 5,256,942 A | 10/1993 | Wood | 6,383,114 B1 | 5/2002 | Hoshiya et al. |
| 5,280,864 A | 1/1994 | Woodward | 6,385,521 B1 | 5/2002 | Ito |
| 5,287,773 A | 2/1994 | Nakawaki et al. | 6,389,348 B1 | 5/2002 | Takagi et al. |
| 5,305,974 A | 4/1994 | Willis | 6,401,022 B2 | 6/2002 | Kubota et al. |
| 5,313,851 A | 5/1994 | Hull et al. | 6,405,115 B2 | 6/2002 | Taniguchi et al. |
| 5,334,060 A | 8/1994 | Butka | 6,409,623 B1 | 6/2002 | Hoshiya et al. |
| 5,334,097 A | 8/1994 | Tatara et al. | 6,411,878 B2 | 6/2002 | Hanawa et al. |
| 5,335,561 A | 8/1994 | Harvey | 6,428,444 B1 | 8/2002 | Tabata |
| 5,377,936 A | 1/1995 | Mitchell | 6,430,483 B2 | 8/2002 | Takaoka et al. |
| 5,388,469 A | 2/1995 | Woltering | 6,432,024 B2 | 8/2002 | Hattori et al. |
| 5,388,470 A | 2/1995 | Marsh, Jr. | 6,440,037 B2 | 8/2002 | Takagi et al. |
| 5,393,272 A | 2/1995 | Okuwaki et al. | 6,443,871 B2 | 9/2002 | Taniguchi et al. |
| 5,409,424 A | 4/1995 | Okuwaki et al. | 6,449,552 B2 | 9/2002 | Ohba et al. |
| 5,410,198 A | 4/1995 | Butka | 6,449,948 B2 | 9/2002 | Soga et al. |
| 5,427,330 A | 6/1995 | Shimshi | 6,450,917 B2 | 9/2002 | Taniguchi et al. |
| 5,439,423 A | 8/1995 | Okuwaki et al. | 6,454,364 B1 | 9/2002 | Niwa et al. |
| 5,473,957 A | 12/1995 | Navarro | 6,459,978 B2 | 10/2002 | Taniguchi et al. |
| 5,488,877 A | 2/1996 | Lieurance | 6,461,261 B2 | 10/2002 | Yamamoto et al. |
| 5,489,001 A | 2/1996 | Yang | 6,484,832 B1 | 11/2002 | Morisawa et al. |
| 5,517,410 A | 5/1996 | Nakagawa et al. | 6,493,626 B2 | 12/2002 | Mitani et al. |
| 5,557,988 A | 9/1996 | Claxton | 6,494,801 B1 | 12/2002 | Ohtake et al. |
| 5,655,992 A | 8/1997 | Hattori | 6,494,809 B1 | 12/2002 | Suzuki et al. |
| 5,673,872 A | 10/1997 | Shimshi | 6,502,472 B2 | 1/2003 | Hewatt |
| 5,679,099 A | 10/1997 | Kato et al. | 6,503,170 B1 | 1/2003 | Tabata |
| 5,685,196 A | 11/1997 | Foster, Sr. | 6,508,735 B1 | 1/2003 | Murakami et al. |
| 5,722,911 A | 3/1998 | Ibaraki et al. | 6,508,741 B1 | 1/2003 | Murakami et al. |
| 5,725,064 A | 3/1998 | Ibaraki et al. | 6,514,175 B2 | 2/2003 | Taniguchi et al. |
| 5,782,134 A | 7/1998 | Booden | 6,517,464 B2 | 2/2003 | Yamazaki et al. |
| 5,789,882 A | 8/1998 | Ibaraki et al. | 6,520,136 B2 | 2/2003 | Ito et al. |
| 5,791,188 A | 8/1998 | Howard | 6,522,024 B1 | 2/2003 | Takaoka et al. |
| 5,819,897 A | 10/1998 | Murata | 6,524,217 B1 | 2/2003 | Murakami et al. |
| 5,831,354 A | 11/1998 | Stopplecamp | 6,537,179 B2 | 3/2003 | Yamamoto et al. |
| 5,833,570 A | 11/1998 | Tabata et al. | 6,540,035 B2 | 4/2003 | Nagano et al. |
| 5,839,533 A | 11/1998 | Mikami et al. | 6,546,910 B2 | 4/2003 | Tanaka et al. |
| 5,841,201 A | 11/1998 | Tabata et al. | 6,549,840 B1 | 4/2003 | Mikami et al. |
| 5,856,709 A | 1/1999 | Ibaraki et al. | 6,565,465 B2 | 5/2003 | Nishigaya et al. |
| 5,860,317 A | 1/1999 | Laithwaite et al. | 6,565,473 B2 | 5/2003 | Endo et al. |

| | | |
|---|---|---|
| 6,565,480 B2 | 5/2003 | Endo et al. |
| 6,569,059 B1 | 5/2003 | Ito |
| 6,591,173 B2 | 7/2003 | Nada |
| 6,598,945 B2 | 7/2003 | Shimada et al. |
| 6,602,163 B2 | 8/2003 | Tamura et al. |
| 6,607,467 B2 | 8/2003 | Tabata |
| 6,609,403 B2 | 8/2003 | Mitsubayashi et al. |
| 6,615,940 B2 | 9/2003 | Morisawa |
| 6,625,534 B2 | 9/2003 | Suzuki et al. |
| 6,626,797 B2 | 9/2003 | Shiiba et al. |
| 6,629,024 B2 | 9/2003 | Tabata et al. |
| 6,637,530 B1 | 10/2003 | Endo et al. |
| 6,641,498 B2 | 11/2003 | Okuwaki |
| 6,651,299 B2 | 11/2003 | Mitsubayashi et al. |
| 6,655,485 B1 | 12/2003 | Ito et al. |
| 6,656,084 B2 | 12/2003 | Inoue et al. |
| 6,662,904 B2 | 12/2003 | Omote et al. |
| 6,668,224 B2 | 12/2003 | Kawai et al. |
| 6,672,415 B1 | 1/2004 | Tabata |
| 6,672,981 B2 | 1/2004 | Inoue et al. |
| 6,687,580 B2 | 2/2004 | Suzuki et al. |
| 6,695,743 B2 | 2/2004 | Tanaka et al. |
| 6,722,332 B2 | 4/2004 | Kojima |
| 6,726,594 B2 | 4/2004 | Mizuno et al. |
| 6,736,753 B2 | 5/2004 | Endo et al. |
| 6,739,998 B2 | 5/2004 | Iwata et al. |
| 6,740,006 B2 | 5/2004 | Tabata |
| 6,749,534 B2 | 6/2004 | Watanabe et al. |
| 6,752,225 B2 | 6/2004 | Kojima |
| 6,757,599 B2 | 6/2004 | Nada |
| 6,758,788 B2 | 7/2004 | Itou |
| 6,764,427 B2 | 7/2004 | Tamaki et al. |
| 6,790,157 B2 | 9/2004 | Tabata |
| 6,790,158 B2 | 9/2004 | Tabata |
| 6,792,750 B2 | 9/2004 | Nagai et al. |
| 6,807,448 B1 | 10/2004 | Suzuki et al. |
| 6,811,229 B2 | 11/2004 | Soga |
| 6,813,551 B2 | 11/2004 | Taniguchi et al. |
| 6,817,965 B2 | 11/2004 | Tabata |
| 6,830,536 B2 | 12/2004 | Tanaka et al. |
| 6,832,974 B2 | 12/2004 | Kakamu et al. |
| 6,834,224 B2 | 12/2004 | Shiiba et al. |
| 6,835,147 B2 | 12/2004 | Iwata et al. |
| 6,837,215 B2 | 1/2005 | Nishigaki et al. |
| 6,866,610 B2 | 3/2005 | Ito |
| 6,868,674 B2 | 3/2005 | Tabata et al. |
| 6,871,129 B2 | 3/2005 | Kitaori et al. |
| 6,875,152 B2 | 4/2005 | Iwatuki et al. |
| 6,881,165 B2 | 4/2005 | Endo et al. |
| 6,898,506 B2 | 5/2005 | Kawai et al. |
| 6,902,512 B2 | 6/2005 | Kamichi et al. |
| 6,904,342 B2 | 6/2005 | Hanada et al. |
| 6,904,881 B2 | 6/2005 | Hirowatari et al. |
| 6,907,970 B2 | 6/2005 | Sugimura |
| 6,920,384 B2 | 7/2005 | Shiimado et al. |
| 6,942,598 B2 | 9/2005 | Kondo et al. |
| 6,957,874 B2 | 10/2005 | Hara et al. |
| 6,974,009 B2 | 12/2005 | Hoshiya et al. |
| 6,976,741 B2 | 12/2005 | Hara et al. |
| 6,979,280 B2 | 12/2005 | Oshima et al. |
| 6,991,581 B2 | 1/2006 | Murakami et al. |
| 6,994,177 B2 | 2/2006 | Ito et al. |
| 6,994,648 B2 | 2/2006 | Miyata et al. |
| 7,010,911 B2 | 3/2006 | Morise et al. |
| 7,013,691 B2 | 3/2006 | Shimoda |
| 7,018,315 B2 | 3/2006 | Endo et al. |
| 7,028,795 B2 | 4/2006 | Tabata |
| 7,029,418 B2 | 4/2006 | Taketsuna et al. |
| 7,040,187 B2 | 5/2006 | Amamiya et al. |
| 7,044,890 B2 | 5/2006 | Kojima et al. |
| 7,048,671 B2 | 5/2006 | Morisawa et al. |
| 7,052,434 B2 | 5/2006 | Makino et al. |
| 7,052,435 B2 | 5/2006 | Tabata et al. |
| 7,059,997 B2 | 6/2006 | Nishizawa et al. |
| 7,066,860 B2 | 6/2006 | Habuchi et al. |
| 7,074,160 B1 | 7/2006 | Inoue et al. |
| 7,080,724 B2 | 7/2006 | Hasegawa et al. |
| 7,081,060 B2 | 7/2006 | Hata et al. |
| 7,087,890 B2 | 8/2006 | Amamiya et al. |
| 7,090,612 B2 | 8/2006 | Ozeki et al. |
| 7,094,175 B2 | 8/2006 | Taketsuna et al. |
| 7,094,177 B2 | 8/2006 | Inoue et al. |
| 7,101,309 B2 | 9/2006 | Ozeki et al. |
| 7,107,869 B2 | 9/2006 | Amamiya et al. |
| 7,108,630 B2 | 9/2006 | Ozeki et al. |
| 7,115,065 B2 | 10/2006 | Tabata et al. |
| 7,125,361 B2 | 10/2006 | Taketsuna et al. |
| 7,128,685 B2 | 10/2006 | Taketsuna et al. |
| 7,131,933 B2 | 11/2006 | Tabata |
| 7,134,538 B2 | 11/2006 | Hasegawa et al. |
| 7,140,218 B2 | 11/2006 | Shimoda |
| 7,146,262 B2 | 12/2006 | Matsubara et al. |
| 7,149,616 B2 | 12/2006 | Matsubara et al. |
| 7,165,638 B2 | 1/2007 | Ito et al. |
| 7,166,055 B2 | 1/2007 | Taketsuna et al. |
| 7,168,515 B2 | 1/2007 | Ito et al. |
| 7,178,618 B2 | 2/2007 | Komeda et al. |
| 7,182,412 B2 | 2/2007 | Ogawa |
| 7,185,641 B2 | 3/2007 | Suzuki |
| 7,188,717 B2 | 3/2007 | Hoshiya et al. |
| 7,189,184 B2 | 3/2007 | Oshiumi et al. |
| 7,189,187 B2 | 3/2007 | Nakayashiki et al. |
| 7,207,404 B2 | 4/2007 | Ito et al. |
| 7,211,024 B2 | 5/2007 | Taketsuna et al. |
| 7,226,385 B2 | 6/2007 | Tabata et al. |
| 7,238,133 B2 | 7/2007 | Tabata et al. |
| 7,243,010 B2 | 7/2007 | Tabata et al. |
| 7,249,642 B2 | 7/2007 | Tabata et al. |
| 7,252,619 B2 | 8/2007 | Tabata et al. |
| 7,258,090 B2 | 8/2007 | Kawasaki |
| 7,273,120 B2 | 9/2007 | Tabata |
| 7,288,043 B2 | 10/2007 | Shioiri et al. |
| 7,289,892 B2 | 10/2007 | Isogai et al. |
| 7,290,420 B2 | 11/2007 | Shimoda |
| 7,290,841 B2 | 11/2007 | Isono |
| 7,291,093 B2 | 11/2007 | Yamamoto et al. |
| 7,294,075 B2 | 11/2007 | Yamaguchi et al. |
| 7,300,380 B2 | 11/2007 | Iwatsuki et al. |
| 7,301,245 B2 | 11/2007 | Sugiura et al. |
| 7,306,541 B2 | 12/2007 | Ogawa |
| 7,318,408 B2 | 1/2008 | Takamatsu et al. |
| 7,318,787 B2 | 1/2008 | Tabata et al. |
| 7,322,900 B2 | 1/2008 | Ichioka et al. |
| 7,322,902 B2 | 1/2008 | Tabata et al. |
| 7,324,886 B2 | 1/2008 | Yumoto et al. |
| 7,325,665 B2 | 2/2008 | Kamishima et al. |
| 7,328,094 B2 | 2/2008 | Nagai et al. |
| 7,337,767 B2 | 3/2008 | Magarida et al. |
| 7,340,335 B2 | 3/2008 | Kitaori et al. |
| 7,354,373 B2 | 4/2008 | Abiru et al. |
| 2001/0032522 A1 | 10/2001 | Davis, Jr. |
| 2002/0148308 A1 | 10/2002 | Rush |

FOREIGN PATENT DOCUMENTS

FR          EP-0123456 A2     1/2000

OTHER PUBLICATIONS

Written Opinion for International (PCT) Application No. PCT/US06/12900, mailed Mar. 4, 2008.

Honda Accord Hybrid vs. Toyota Camry Hybrid—Forums available at http://townhall-talk.edmunds.com/direct/biew/.ef26ffa/0, dated Jun. 7, 2005 (10 pages).

* cited by examiner

METHOD AND APPARATUS FOR GYROSCOPIC PROPULSION

CROSS REFERENCE TO RELATED APPLICATION

The present application claims the benefits, under 35 U.S.C.§119(e), of U.S. Provisional Application Ser. No. 60/673,011, filed Apr. 19, 2005, and 60/689.595, filed Jun. 9, 2005, of the same title, each of which is incorporated herein by this reference.

FIELD

The invention relates generally to propulsion systems and particularly to gyroscopic propulsion systems.

BACKGROUND

As demand for hydrocarbon energy skyrockets and hydrocarbon energy reserves continue to decrease, an energy crisis is confronting the civilized world. A number of measures have been introduced to alleviate the crisis. More efficient hydrocarbon engines are now in widespread use. Hybrid vehicles having regenerative braking have been introduced. Research and development of fuel cell technology continues at a rapid pace. Even with these measures, there remains a need for a highly efficient propulsion system.

Gyroscopic propulsion systems have been developed to address this need. Gyroscopic systems can theoretically propel an object without relying on frictional forces—the key forces used by conventional vehicles. A gyroscope is generally a disk free to rotate about an axis which itself is confined within framework that is free to rotate about one axis or two. The two qualities of a gyroscope that account for its usefulness are: first, the axis of a free gyroscope will remain fixed in space provided no external forces act upon it, and, second, a gyroscope can be made to deliver a torque which is proportional to the angular velocity about a perpendicular axis. Both qualities stem from the principle of conservation of momentum under which the total angular momentum of the system relative to any point fixed in space remains constant provided that no external forces act on the system. In a typical gyroscopic propulsion system, a number of rotating gyroscopes are themselves rotated around a common point. The gyroscopes are misbalanced, causing a displacement of the propulsion system. As will be appreciated, an imbalance can create a propulsive force. These systems have been largely unsuccessful however because they have generally failed to generate sufficient propulsive forces to be practical.

SUMMARY

These and other needs are addressed by the various embodiments and configurations of the present invention. The present invention is directed generally to a propulsion system and method that uses torque applied unequally around the circumference of a rotating body to impart a propulsive force.

In one embodiment of the present invention, a propulsion method is provided that includes the steps of:

(a) rotating a rotating member that engages one or more drive members;

(b) at a first angular position, setting the drive member(s) to an unlocked state in which the drive members apply substantially no resistance to rotation of the rotating member; and (c) at a second angular position, setting the drive member (s) to a locked state in which the drive member(s) resist rotation of the rotating member.

In another embodiment of the present invention, a propulsion method is provided that includes the steps of:

(a) rotating a rotating member that engages a number of drive members;

(b) setting a first set of drive members to an unlocked state in which the drive members apply substantially no resistance to rotation of the rotating member; and (c) simultaneously setting a second set of drive members to a locked state in which the drive members resist rotation of the rotating member.

In one configuration, the first set of drive members are positioned in a first angular or unlocked zone (in which the drive members are in the unlocked state), and the second set of drive members are in a second angular or locked zone (in which the drive members are in the locked state). To provide spatial displacement of a vehicle including the propulsion system, the first angle subtended by the first angular zone is commonly greater than the second angle subtended by the second angular zone.

Each of the drive members commonly includes a brake assembly, a gyroscopic member, and a housing. The gyroscopic member in turn includes a gyroscope rotatably disposed in the housing. In the locked state, the brake assembly retards rotation of the drive member relative to the rotating member and, in the unlocked state, the brake assembly does not retard rotation of the drive member.

Typically, the rotational axes of the gyroscopes in the first set of drive members are transverse to the rotational axes of the gyroscopes in the second set of drive members at a selected point in time, and the relative rotational speeds of the rotating member, the drive member, and the gyroscopes in the drive members are different from one another. The rotational speeds of the gyroscopes may be the same or different from one another. In a preferred configuration, the rotational axes of the rotating member and the drive members are substantially parallel and perpendicular to the rotational axis of each gyroscope.

The direction of displacement of a vehicle including the propulsion system is normal to radial line extending from the axis of rotation of the rotating member to a point on a periphery of the second angular zone.

The position of the second angular zone can be changed to change a direction of displacement. For example, the vehicle can be decelerated by changing the position of the second angular zone so that the resulting direction of displacement is substantially opposite to the vehicle's current direction of displacement.

The vehicle can be accelerated by increasing a rotational speed of the gyroscopes and/or rotating member.

The propulsion system and method can have a number of advantages. The propulsion system can provide displacement of a vehicle, such as an aircraft, hovercraft, or spacecraft, without using friction or aerodynamic forces. In other words, the propulsion system can be frictionless and thereby can provide a highly efficient method of propulsion. Unlike prior gyroscopic propulsion systems, the system of the present invention preferably does not use imbalance to impart motion.

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, and A, B and C together.

DETAILED DESCRIPTION

Figure 1:
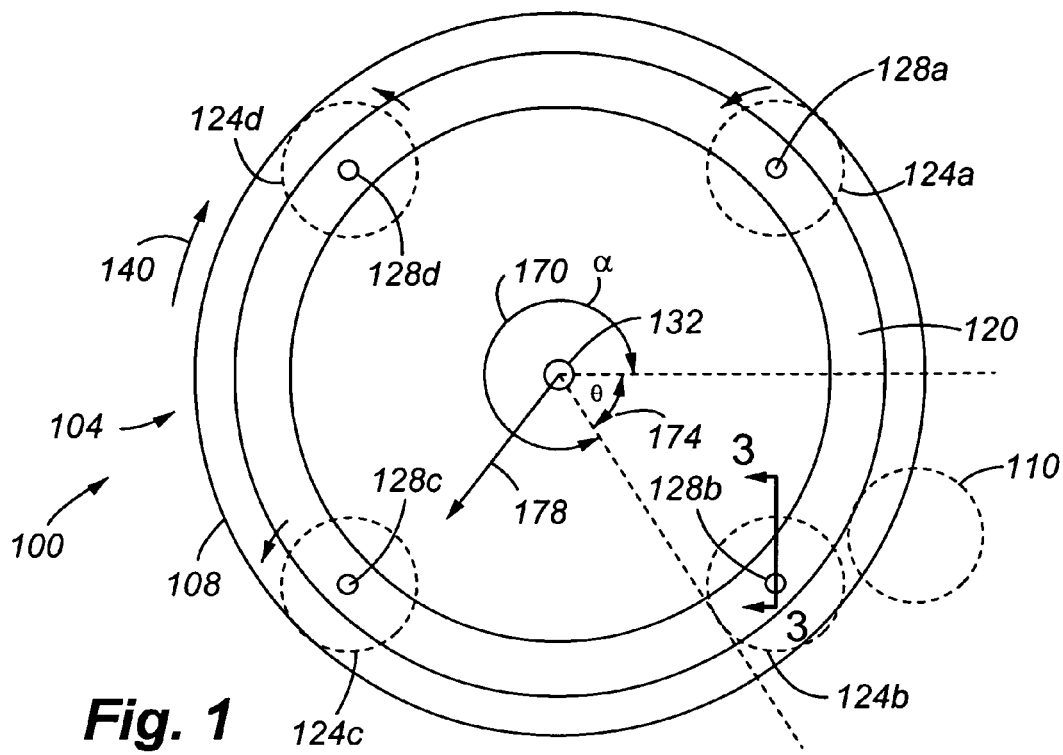
FIG. 1 is a plan view of a propulsion system according to an embodiment of the present invention.

The gyroscopic propulsion system of one embodiment of the present invention will be discussed with reference to FIGS. 1-4. The gyroscopic propulsion system 100 includes a gyroscopic drive assembly 104, an engine 110 for rotating the drive assembly 104, and a mounting member 108 to which the assembly 104 is rotatably connected, such as by one or more gears or bearings (not shown). The mounting member 108 is physically connected to the vehicle that is to be propelled by the propulsion system 100. The engine 110 rotatingly engages a gear 112 that interlockingly engages (meshes with) a drive gear 116 to rotate the assembly 104.

Figure 2:
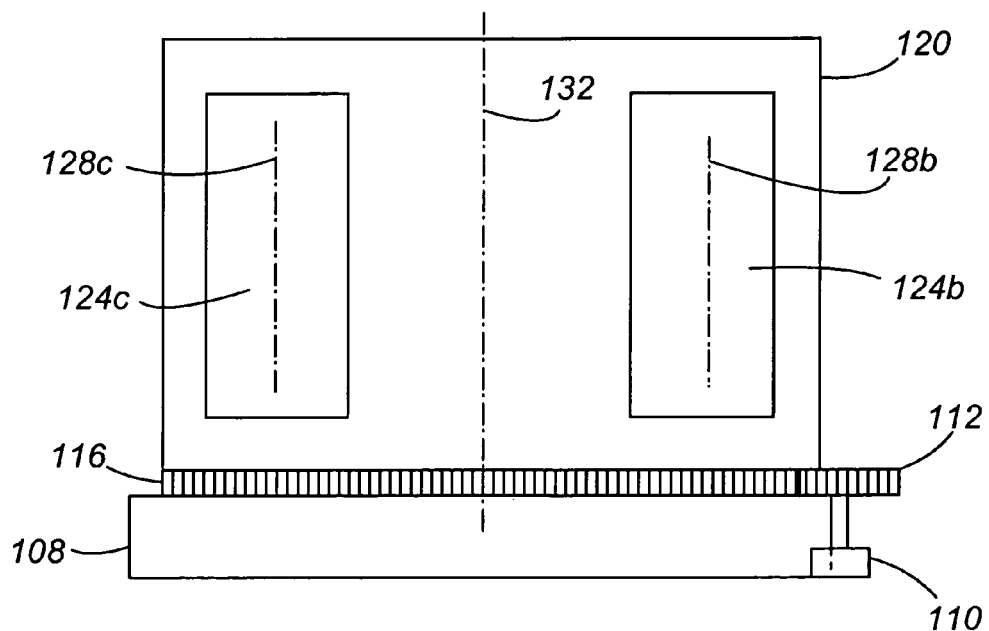
FIG. 2 is a side view of the propulsion system of FIG. 1.
Figure 3:
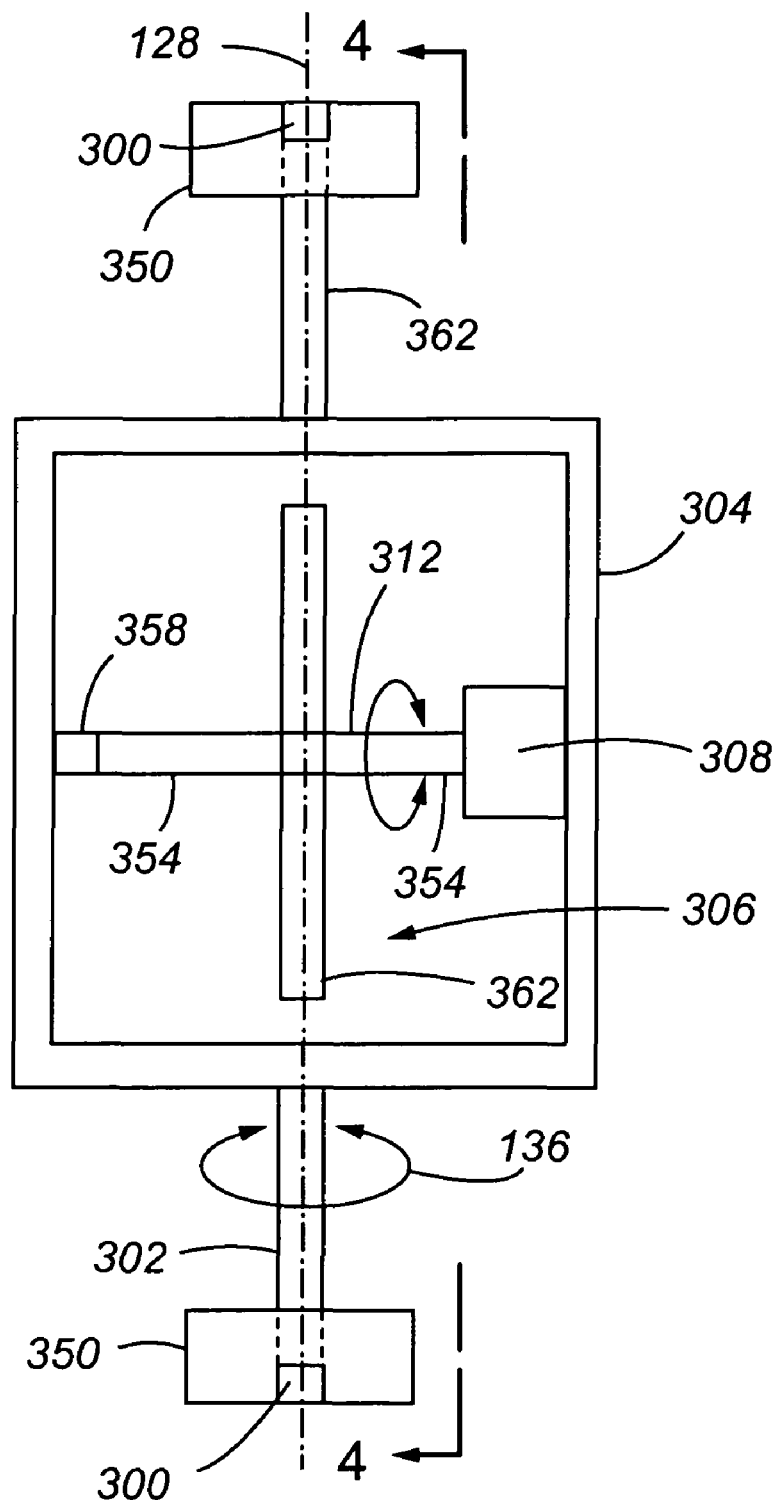
FIG. 3 is a cross-sectional view taken along line 3-3 of FIG. 1.
Figure 4:
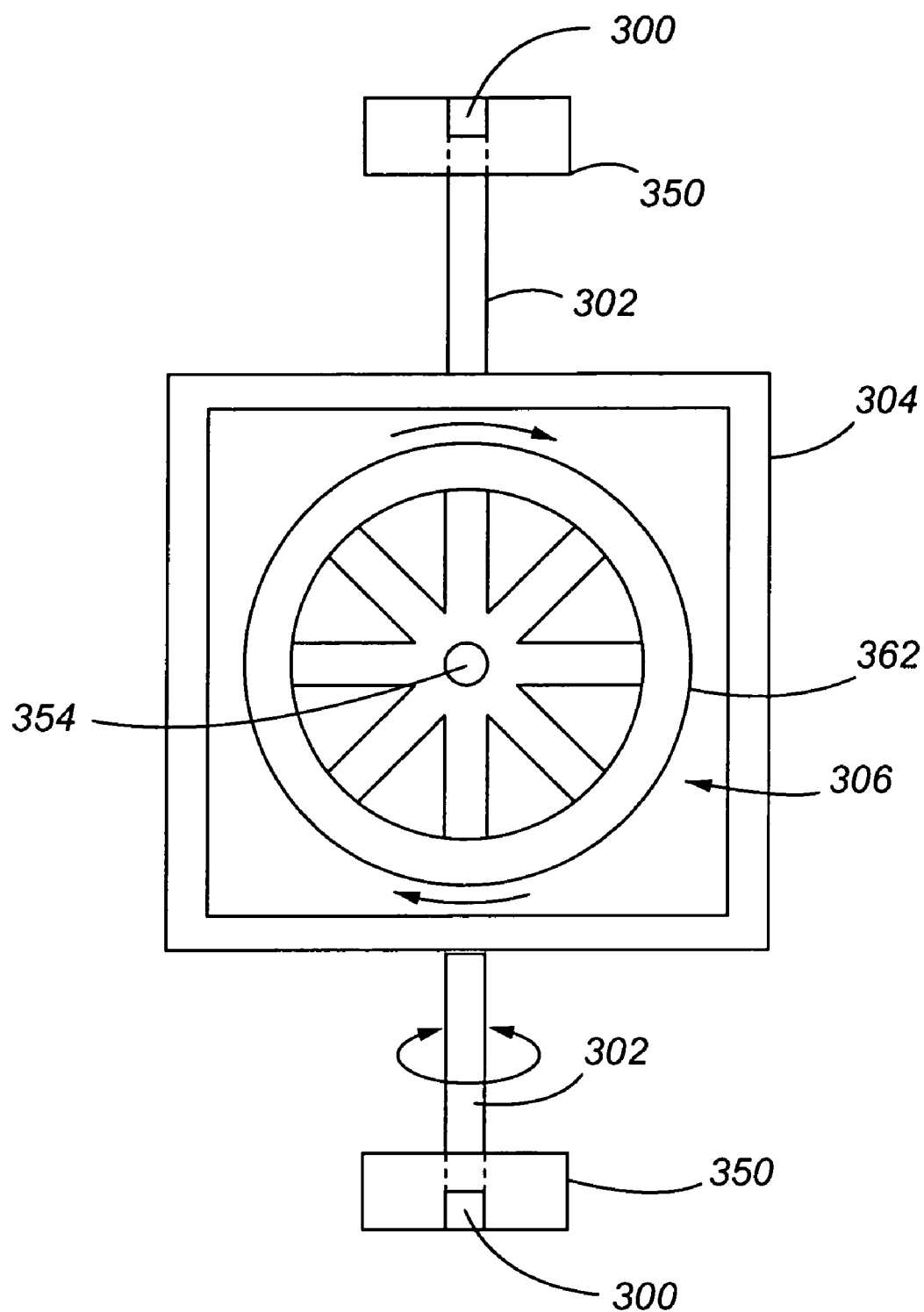
FIG. 4 is a cross-sectional view taken along line 4-4 of FIG. 3.

The gyroscopic drive assembly 104 includes a rotating member 120 nonrotatably connected to the drive gear 116 and a plurality of gyroscopic drive members 124a-d rotatably mounted to the rotating member 120 by bearings 300. As can be seen in FIG. 2, the various drive members 124a-d rotate about a respective axis of rotation 128a-d that is parallel to the axis of rotation 132 of the rotating member 120. As discussed below, the direction of rotation 136 of each of the drive members 124a-d is commonly opposite to the direction of rotation 140 of the rotating member 120 due to the need for the gyroscopic members in each drive member to remain fixed in space.

Each of the drive members 124a-d includes a housing 304, axles 302 nonrotatably attached to the housing 304, a gyroscopic member 306, a motor 308 for rotatably driving the axle 312 of the gyroscopic member 306, and upper and lower brake assemblies 350 to slow and/or completely stop rotation of the axles 302 relative to the rotating member 120. The gyroscopic member 306 includes axles 354, rotatably mounted on the housing 304 by the bearing 358, and a gyroscope 362. As can be seen from FIGS. 3-4, the gyroscope 362 has multiple degrees of freedom. Any number of members 124 may be employed whether odd or even but preferably the members are uniformly distributed around the circumference of the rotating member 120. Stated another way, the various members 124 are separated by a substantially equal radial or circumferential distance.

The gyroscope can be any structure including one or more symmetrical disks, which are typically relatively heavy (e.g., 150 pounds or more), disposed concentrically about the central axle or shaft 354 (having the axis of rotation as its longitudinal axis) that is free to rotate about the axis of rotation which itself is confined within the frame. In other embodiments, the frame includes nested subframes that are free to rotate about one or more axes (i.e., have one or more degrees of freedom). The gyroscope has an axis of rotation that remains fixed in space and will resist directional movement. The gyroscope can deliver a torque that is proportional to the angular velocity of the frame about an axis perpendicular to the gyroscope's axis of rotation. Under the principle of conservation of angular momentum, the total angular momentum of any system of particles relative to any point fixed in space remains constant, provided no external force(s) act on the system.

Figure 7:
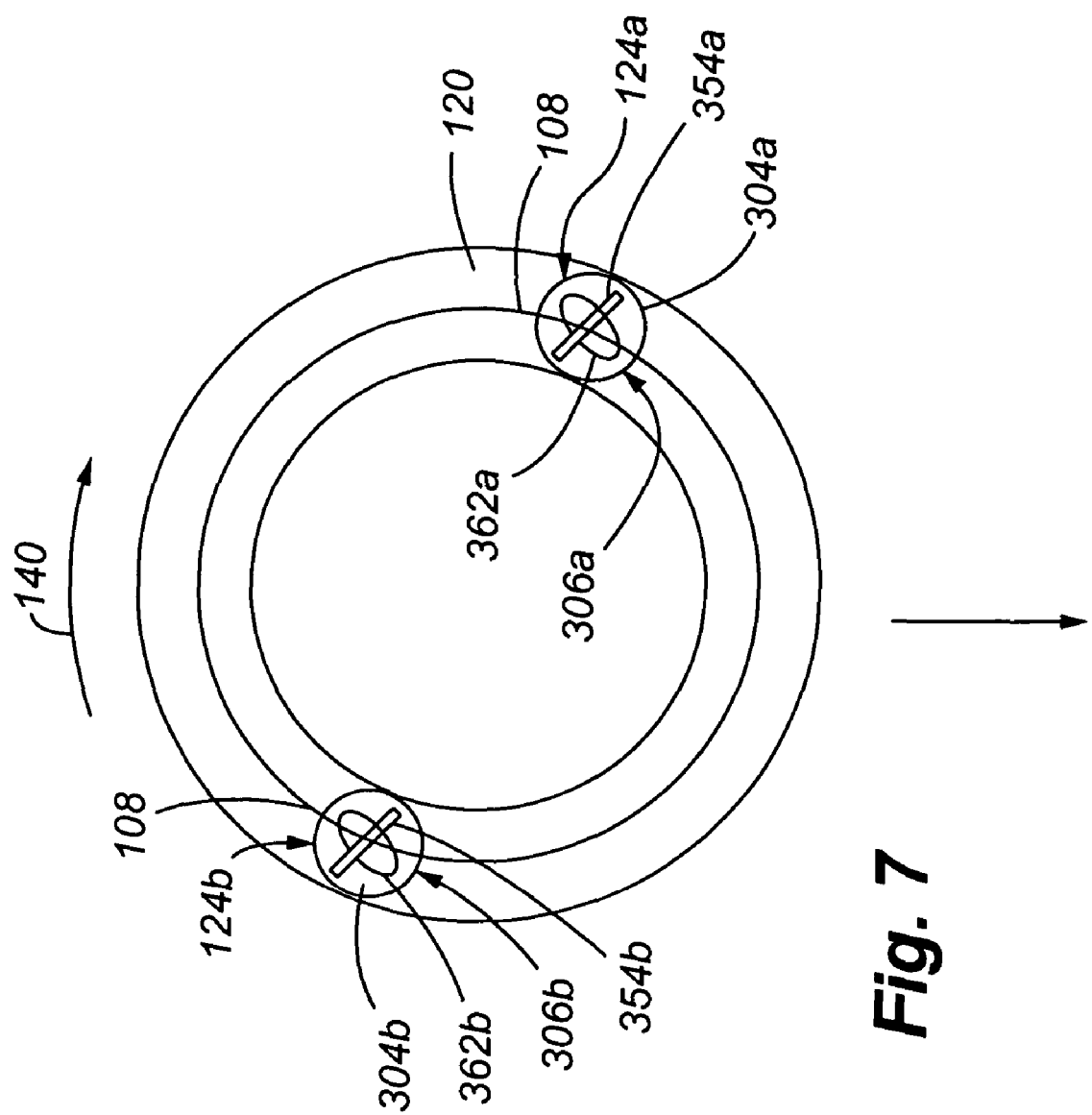
FIG. 7 is an elevational view of a propulsion system according to an embodiment of the present invention.

FIG. 7 is another view showing the rotating member 120 as having a plurality of gyroscopic drive members 124a-b rotatably mounted to the rotating member 120. Typically, drive members 124a-b are rotatably connected to a mounting member 108, such as by one or more gears or bearings (not shown). Drive members 124a-b are shown generally as respectively including gyroscopic members 306a-b having gyroscopes 362a-b mounted on shafts or axles 354a-b that are rotatably mounted within housings 304a-b. In this way, rotation 140 of rotating member 120 in the opposite direction of the direction of rotation of drive members 124a-b enables each of gyroscopic members 306a-b of drive members 124a-b to remain fixed in space.

Figure 8:
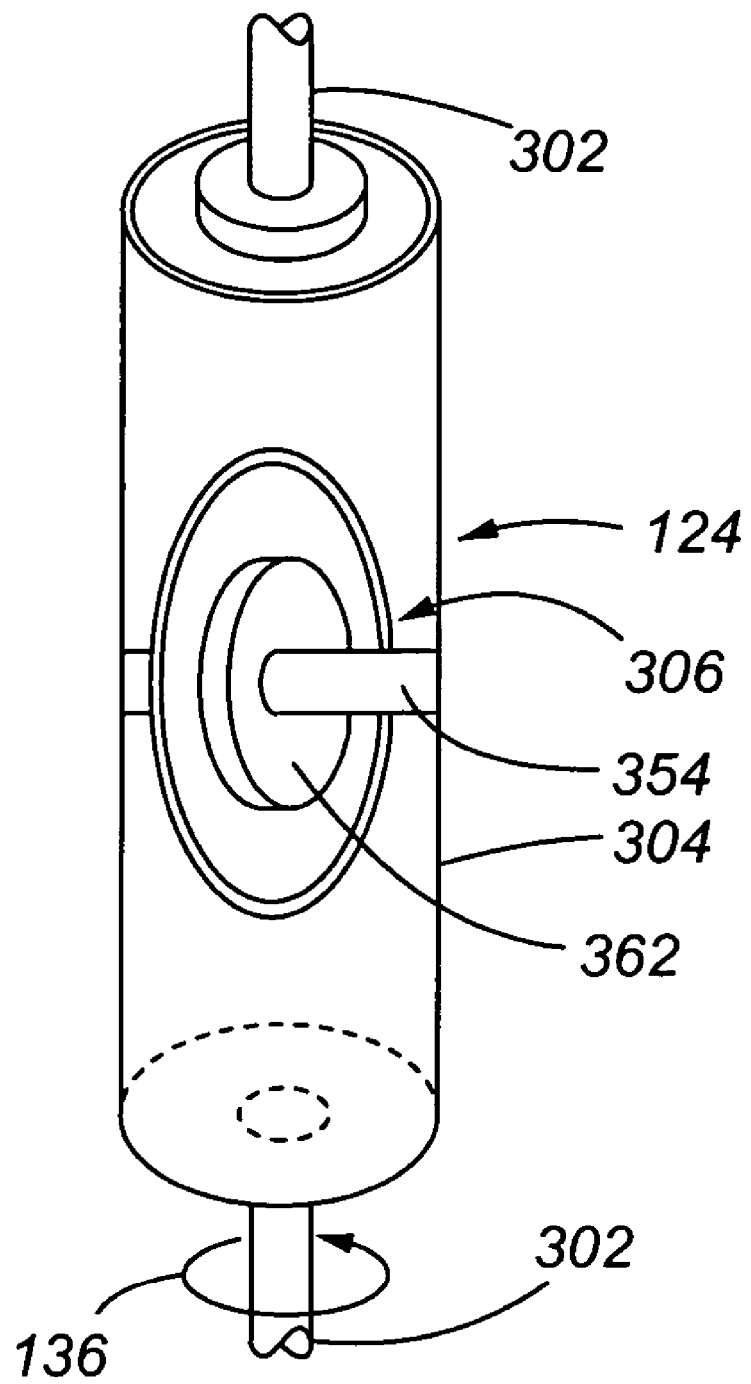
FIG. 8 is a perspective view of a drive member according to an embodiment of the present invention.
Figure 9:
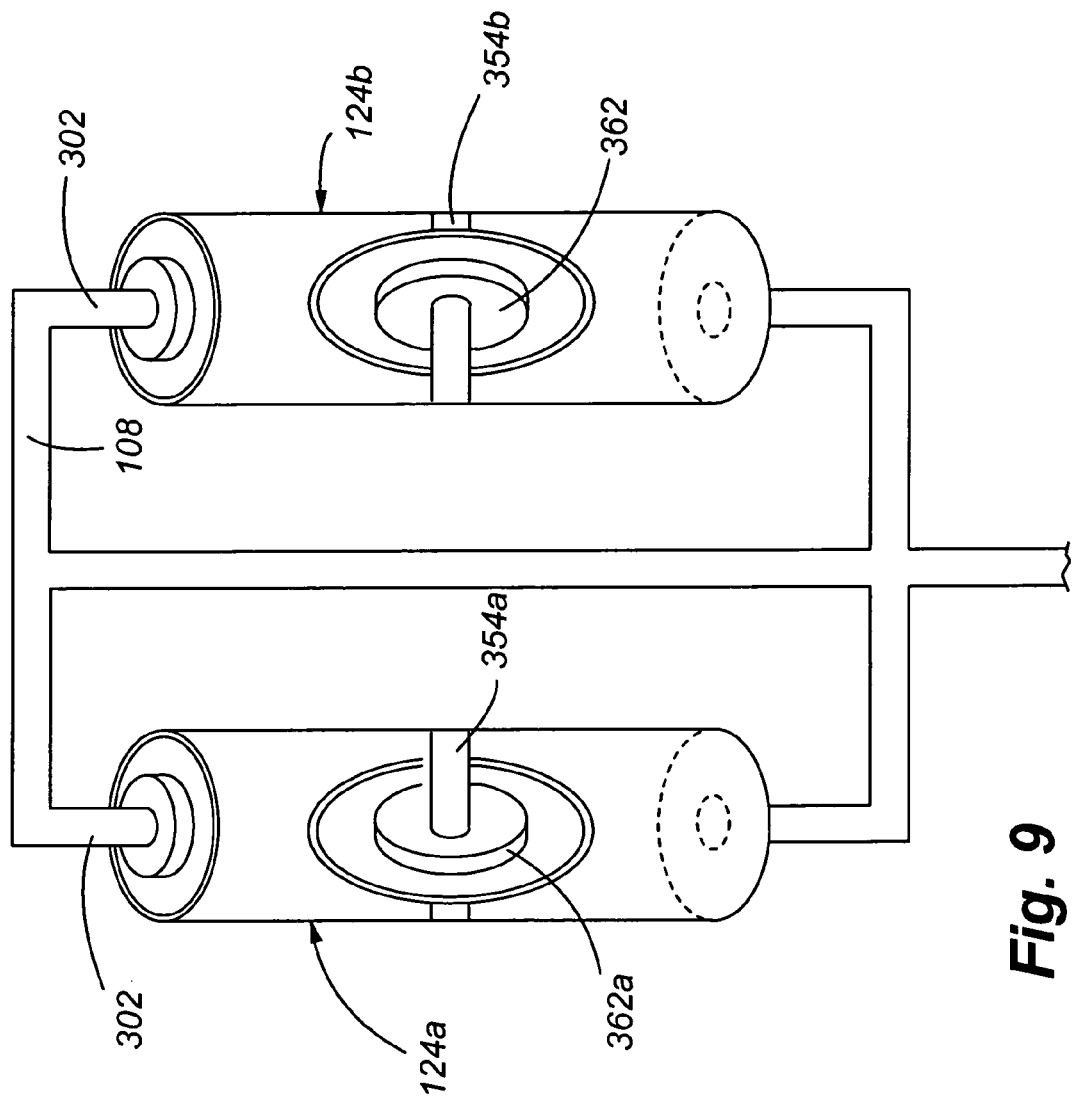
FIG. 9 is an elevational view of a pair of drive members according to an embodiment of the present invention.

FIGS. 8-9 provide another view of a drive member 124 in accordance with the present invention. In particular, FIG. 8 illustrates a drive member 124 having a housing 304 and a gyroscopic member 306. Axle 302 is nonrotatably connected to housing 304 and typically rotates in the direction designated by numeral 136. Gyroscopic member 306 includes a gyroscope 362 mounted within the housing 304 on axle 354. FIG. 9 more particularly shows two drive members of the type shown in FIG. 7, drive members 124a-b, having gyroscopic members 306a-b. Gyroscopic members 306a-b include gyroscopes 362 a-b mounted within the housings 304a-b on axles 354a-b.

The operation of the gyroscopic propulsion system 100 will now be discussed. To initiate propulsion, the engine 110 places the rotating member 120 in a first direction of rotation. Before, during, or after rotation of the rotating member 120, the respective motors 308 of each drive member places the gyroscope 362 in rotation. As the rotating member 120 rotates, the various drive members have full freedom of rotation and freely rotate in the opposite direction so that the rotating gyroscopes 362 can maintain desired positions in space. As will be appreciated, the relative orientations of each of the drive members relative to the rotating member 120 and to one another is generally unimportant. Typically, the various drive members will have transverse or nonparallel axes of rotation. When the various rotating members are rotating at desired rotational speeds, the propulsion sequence is initiated.

Figure 5:
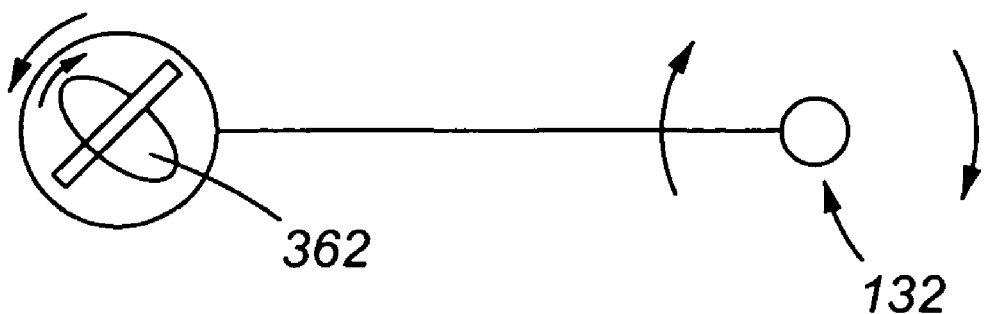
FIG. 5 depicts the behavior of a gyroscopic member in the unlocked state.
Figure 6:
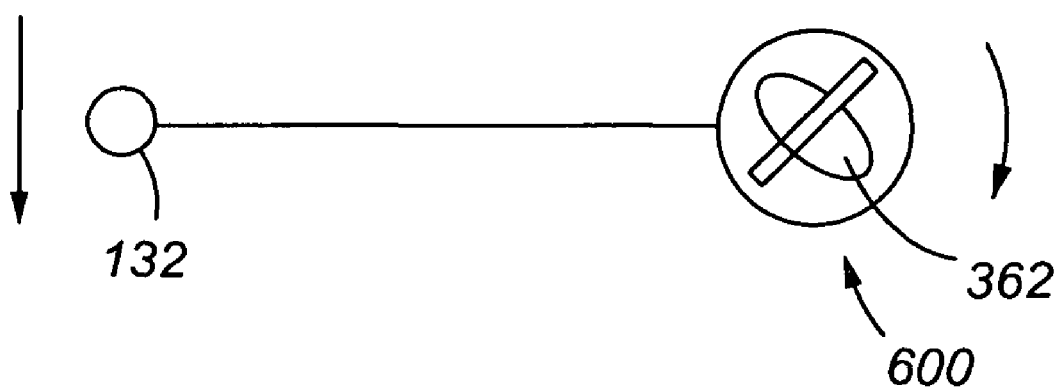
FIG. 6 depicts the behavior of a gyroscopic member in the locked state.

The propulsion sequence will now be discussed with reference to FIGS. 1-6. To understand the operation of the system 100, it is important to understand the operational modes of each of the drive members. In the freewheeling or unlocked state, the drive member is free to rotate about its respective rotational axis 128. This state is shown in FIG. 5. In the braking or locked state, the drive member is not free to rotate about its respective axes 128. The member is placed in this state by the upper and lower brakes 350 being applied against the axis 302. This state is shown in FIG. 6. The gyroscope 362 resists rotation around the axis of rotation 132 The resistance or force is applied against the rotating member 120 and therefore against the mounting member 108. The force or torque effectively causes a new axis of rotation of the rotating member 120 to occur. The new axis of rotation 600 is located at the center of the gyroscope 362. Stated another way, the axis of rotation 132 of the rotating member 120 effectively rotates about the new axis of rotation 600. This causes spatial displacement of the axis of rotation 132 and therefore of the vehicle containing the system 100.

In certain configurations, the resistance of the member (i.e., the gyroscope's axis of rotation) to being rotated while in the locked state is attributable to the phenomenon of precession. This phenomenon is explained by Newton's law of motion for rotation under which the time rate of change of angular momentum about any given axis is equal to the torque applied about the given axis. Stated another way, the rate of rotation of the axis of rotation about a transversely oriented axis is proportional to the applied torque.

Returning now to FIG. 1, the propulsion sequence will be described in detail. As can be seen from FIG. 1, there are two angular zones 170 and 174. Angular zone 170 (which subtends angle α) corresponds to the freewheeling mode. In other words, the members 124 in the angular zone 170 at any one time are in the unlocked state and are not creating a torque or impart at most an insubstantial torque. Angular zone 174 (which subtends angle θ) corresponds to the braking mode. In other words, the members 124 in the angular zone 174 are in the locked state and impart a substantial torque. The average direction of displacement 178 of the system 100 is commonly normal to the line bisecting the angle θ. Typically, the angle α is greater than 270 degrees and more typically ranges from about 300 to about 345 degrees, and the angle θ is less than 90 degrees, more typically is less about 45 degrees, even more typically is less than about 25 degrees, and even more typically ranges from about 1 to about 15 degrees. In normal propulsion operation, more members 124 will be in freewheeling mode than braking mode at any one time, and freewheeling members 124 are rotating at a higher rotational rate than braking members 124. During an entire rotational cycle of the rotating member 120, a given member 124 will be in the freewheeling mode longer than in the braking mode. The size of the angle θ can be varied during operation of the propulsion system to provide desired propulsive forces to the vehicles.

To create a desired acceleration and/or velocity of displacement, the rotating member and gyroscope rotational speeds are adjusted. For lower speeds, the rotating member and/or gyroscope rotational speeds are reduced and, for higher speeds, the rotating member and/or gyroscope rotational speeds are increased.

To brake or decelerate the vehicle, the position of the locking zone 174 is altered so that it is opposite to the current direction of displacement. Likewise to change the direction of displacement, the location of the locking zone 174 is changed accordingly. This may be readily accomplished by mechanical or electromechanical techniques.

The control of the size and position of the locking zone 174 and the rotational speeds of the rotating member and gyroscopes can be effected by user manipulable mechanical linkages and/or by a logic circuit or software that receives user input, such as by a joystick, and provides appropriate command signals to the engine, brake assembly, and/or motors to implement the commands.

The propulsion system 124 can be used to propel any type of vehicle in any direction, whether up, down, or sideways. The vehicle can be a boat, aircraft, spacecraft, automobile, hovercraft, and submersible vehicles.

Normally, the radius of the rotating member 120 and gyroscope number and weight depend directly on the weight of the vehicle.

Figure 10:
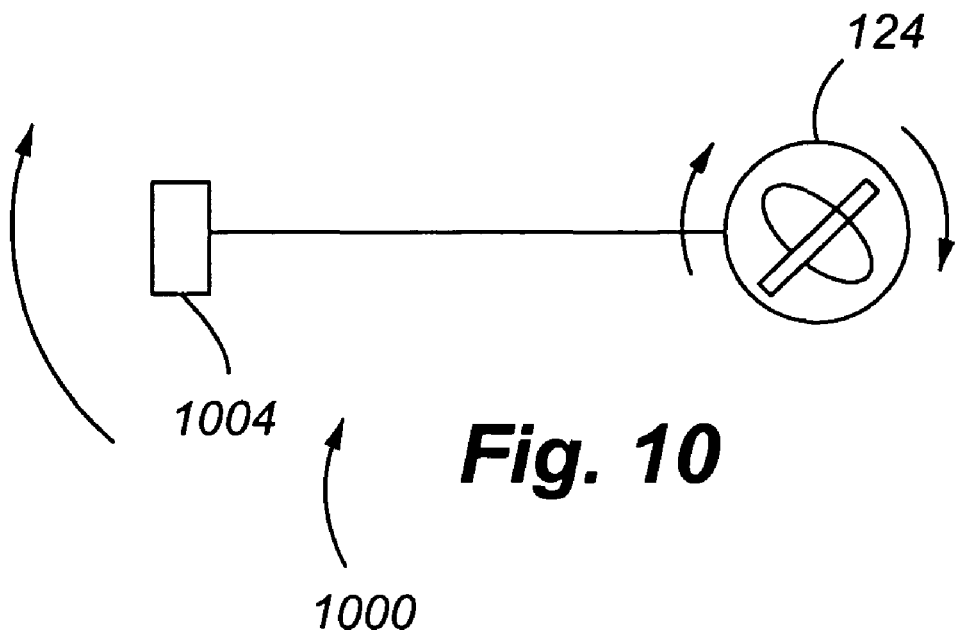
FIG. 10 depicts the behavior of a drive member of another embodiment when in the mass freewheeling (or brake assembly-unlocked) state.
Figure 11:
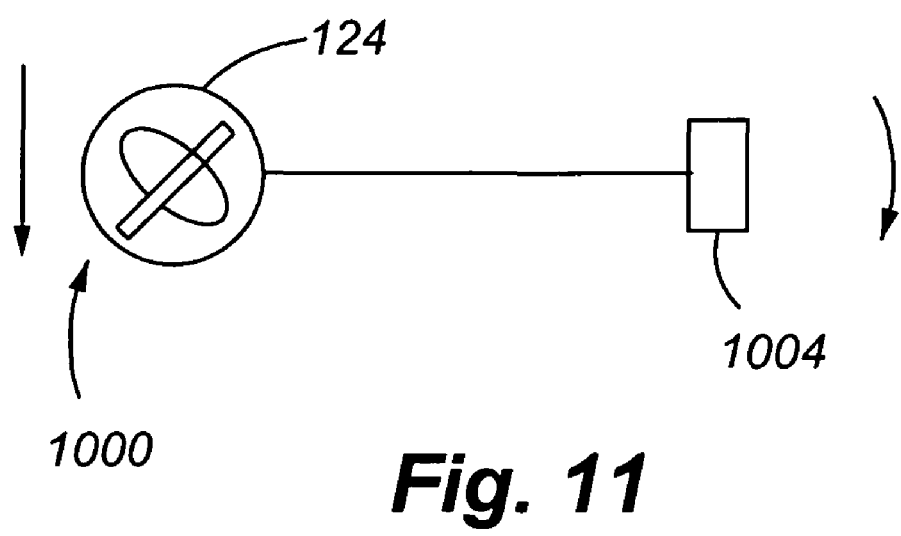
FIG. 11 depicts the behavior of the drive member of FIG. 10 when in the locked (or brake assembly-locked) state.

FIGS. 10-11 depict a propulsion system according to another embodiment of the present invention. In the propulsion system 1000, the axis of rotation 128 of the drive member 124 is co-located and aligned (parallel) with and the axis of rotation 132 of the propulsion system. A mass 1004 is attached to and rotates about the drive member 124. For example, the drive member 124 rotatably engages the drive assembly (or the drive gear 116), and the mass 1004 is part of the rotating member 120 and, in one configuration, represents a mass imbalance around the periphery of the member 120. The mass can be any number of other objects, including a simple weight, a plasma, and the like. By applying the upper and lower brake assemblies 350 at selected angular intervals to slow and/or completely stop rotation of the axles 302 relative to the rotating mass 1004, the axis of rotation 128 of the drive member 124 to be spatially displaced. Gyroscopic resistance or torque created by the locking of the brake assemblies causes the axis of rotation to shift temporarily to the position of the mass, thereby causing directional movement of the drive member.

A number of variations and modifications of the invention can be used. It would be possible to provide for some features of the invention without providing others.

For example in one alternative embodiment, the gyroscope is not physically engaged with the housing of the member 124. To reduce drift of the gyroscope (i.e., departure of the motion from the theoretical) the gyroscope may be floated in the member 124 using a viscous, high density liquid, such as a fluorocarbon. Alternatively, gas bearings may be employed in which the shaft of the gyroscope is supported by a high pressure gas such as helium, air or hydrogen. Alternatively, the gyroscope may be supported in a high vacuum by an electric field (known as an electrostatic gyro) or by a magnetic field (known as a cryogenic gyroscope). Moreover, nonmechanical gyroscopes, such as laser gyroscopes, can be used. As will be appreciated, laser gyroscopes include a solid block of quartz into which holes are drilled to provide paths for the laser beam. Thin-film mirrors are sealed into the unit. Laser energy is transmitted clockwise and counterclockwise simultaneously. At rest, they are the same frequency. When an input rate is present, an output signal is generated that is proportional to the input rate. The gyroscope does not require a rotating mass as in conventional gyroscopes.

In another alternative embodiment, rotationally resistant objects other than gyroscopes are employed in the members 124. As will be appreciated, the drive member 124 can be replaced by any object that can resist rotation and momentarily or longer change, even slightly, the spatial location of the axis of rotation. For example, any mass may be rotated to provide angular momentum.

In another alternative embodiment, a stabilizing gyroscope can be positioned at the rotational axis of the rotating member 120 to permit the rotating member to rotated. This embodiment is particularly useful where the vehicle is in free space and does not have the ability to push off of another object. Alternatively, a second propulsion system can be positioned adjacent to a first propulsion system and counter-rotated relative to one another to provide the same effect.

In another alternative embodiment, the plurality of drive members 124 positioned around the periphery of the rotating member 120 are replaced by a single drive member 124.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A propulsion system, comprising:
an engine; and
a rotating member rotatably engaging the engine and having a rotating member axis of rotation, wherein the rotating member comprises at least one drive member positioned around the circumference of the rotating member, the drive member has a drive member axis of rotation, the drive member includes a gyroscope having a gyroscopic axis of rotation, the drive member has an unlocked state in which the drive member rotates freely and applies substantially no torque to the rotating member and a locked state in which the drive member does not rotate freely and applies a torque to the rotating member, the drive member axis of rotation is substantially parallel to the rotating member axis of rotation, the gyroscopic axis of rotation is transverse to the rotating member axis of rotation, and a displacement force is controlled by controlling a rotation of the drive member about the drive member axis of rotation, whereby at a first time the drive member is in the unlocked state and at a second time the drive member is in the locked state to cause spatial displacement by the displacement force of a vehicle comprising the engine and rotating member.

2. The propulsion system of claim 1, wherein the at least one drive member is a plurality of drive members, wherein at the first time a first set of drive members is in the unlocked state and a second set of drive members is in the locked state, wherein the first set of drive members are positioned in a first angular zone, wherein the second set of drive members are positioned in a second angular zone, wherein the first angular zone subtends a first angle, wherein the second angular zone subtends a second angle, and wherein the first angle is greater than the second angle.

3. The propulsion system of claim 2, wherein the first angle is at least about 270 degrees and the second angle is less than 90 degrees, and wherein the plurality of drive members are substantially uniformly distributed around the circumference of the rotating member.

4. The propulsion system of claim 2, wherein each of the drive members comprise a brake assembly, a gyroscopic member, and a housing, the gyroscopic member including the gyroscope rotatably disposed in the housing and wherein, in the locked state, the brake assembly retards rotation of the drive member relative to the rotating member and, in the unlocked state, the brake assembly does not retard rotation of the drive member.

5. The propulsion system of claim 4, wherein the rotational axes of the gyroscopes in the first set of drive members are transverse to the rotational axes of the gyroscopes in the second set of drive members at a selected point in time.

6. The propulsion system of claim 4, wherein the rotating member has a first rotational speed, the drive member a second rotational speed, and the gyroscope in a selected drive member a third rotational speed, and wherein the first, second, and third rotational speeds are different from one another.

7. A vehicle containing the propulsion system of claim 1.

8. A propulsion method, comprising:
rotating a rotating member about a rotating member axis of rotation, the rotating member operatively engaging a plurality of drive members, each of the drive members having a drive member axis of rotation substantially parallel to the rotating member axis of rotation and comprising a gyroscope having a gyroscope axis of rotation, the gyroscope axis of rotation being transverse to the rotating member axis of rotation and drive member axes of rotation;
setting a first set of drive members to an unlocked state in which the drive members apply substantially no resistance to rotation of the rotating member; and
simultaneously setting a second set of drive members to a locked state in which the drive members resist rotation of the rotating member, wherein a displacement force is controlled by controlling a rotation of the drive members about the drive member axes of rotation.

9. The propulsion method of claim 8, wherein the first set of drive members are positioned at a first time in a first angular zone, wherein the second set of drive members are positioned in a second angular zone, wherein the first angular zone subtends a first angle, wherein the second angular zone subtends a second angle, and wherein the first angle is greater than the second angle.

10. The propulsion method of claim 9, wherein the first angle is at least about 270 degrees and the second angle is less than about 45 degrees.

11. The propulsion method of claim 9, wherein the direction of displacement of a vehicle comprising the rotating member and drive members is normal to radial line extending from the axis of rotation of the rotating member and a point on a periphery of the second angular zone.

12. The propulsion method of claim 9, further comprising at a second later time:
changing the position of the second angular zone to change a direction of displacement.

13. The propulsion method of claim 9, further comprising:
decelerating a vehicle by changing the position of the second angular zone so that the resulting direction of displacement is substantially opposite to the current direction of displacement.

14. The propulsion method of claim 8, wherein each of the drive members comprises a brake assembly, a gyroscopic member, and a housing, the gyroscopic member including the gyroscope rotatably disposed in the housing and wherein, in the locked state, the brake assembly retards rotation of the drive member relative to the rotating member and, in the unlocked state, the brake assembly does not retard rotation of the drive member.

15. The propulsion method of claim 14, wherein the rotational axes of the gyroscopes in the first set of drive members are transverse to the rotational axes of the gyroscopes in the second set of drive members at a selected point in time.

16. The propulsion method of claim 14, wherein the rotating member has a first rotational speed, the drive member a second rotational speed, and the gyroscope in a selected drive member a third rotational speed, and wherein the first, second, and third rotational speeds are different from one another.

17. The method of claim 14, further comprising:
increasing a rotational speed of at least one of the gyroscopes and rotating member to increase a speed of travel.

18. A propulsion system comprising:
a rotating member, the rotating member rotating about a rotating member axis of rotation and operatively engaging a plurality of drive members, each of the drive members having a drive member axis of rotation substantially parallel to the rotating member axis of rotation and comprising a gyroscope having a gyroscope axis of rotation, the gyroscope axis of rotation being transverse to the rotating member axis of rotation and drive member axes of rotation;
means for setting a first set of drive members to an unlocked state in which the drive members apply substantially no resistance to rotation of the rotating member; and
means for simultaneously setting a second set of drive members to a locked state in which the drive members resist rotation of the rotating member, wherein a displacement force is controlled by controlling a rotation of the drive members about the drive member axes of rotation.

19. The propulsion system of claim 18, wherein the first set of drive members are positioned in a first angular zone, wherein the second set of drive members are positioned in a second angular zone, wherein the first angular zone subtends a first angle, wherein the second angular zone subtends a second angle, and wherein the first angle is greater than the second angle.

20. The propulsion system of claim 18, wherein each of the drive members comprise a brake assembly, a gyroscopic member, and a housing, the gyroscopic member including the gyroscope rotatably disposed in the housing and wherein, in the locked state, the brake assembly retards rotation of the drive member relative to the rotating member and, in the unlocked state, the brake assembly does not retard rotation of the drive member.

21. The propulsion system of claim 20, wherein the rotational axes of the gyroscopes in the first set of drive members are transverse to the rotational axes of the gyroscopes in the second set of drive members at a selected point in time.

22. The propulsion system of claim 20, wherein the rotating member has a first rotational speed, the drive member a second rotational speed, and the gyroscope in a selected drive member a third rotational speed, and wherein the first, second, and third rotational speeds are different from one another.

23. A propulsion method, comprising:
(a) rotating a rotating member that engages one or more drive members, the rotating member rotating about a rotating member axis of rotation, each of the one or more drive members having a respective drive member axis of rotation substantially parallel to the rotating member axis of rotation and comprising a respective gyroscope having a gyroscope axis of rotation, the gyroscope axis of rotation being transverse to the rotating member axis of rotation and drive member axes of rotation;
(b) at a first angular position, setting the drive member(s) to an unlocked state in which the drive members apply substantially no resistance to rotation of the rotating member; and
(c) at a second angular position, setting the drive member(s) to a locked state in which the drive member(s) resist rotation of the rotating member, wherein a displacement force is controlled by controlling a rotation of the drive members about the drive member axes of rotation.

24. The propulsion method of claim 23, wherein the rotating member is in a state of rotational imbalance.

25. The propulsion method of claim 23, wherein the one or more drive members comprises first and second sets of drive members, wherein the one or more drive members are positioned around the periphery of the rotating member and wherein the first set of drive members is set to the unlocked state while the second set of drive members is positioned to the locked state.

26. The propulsion method of claim 23, wherein each of the one or more drive members comprise a brake assembly, a gyroscopic member, and a housing, the gyroscopic member including the gyroscope rotatably disposed in the housing and wherein, in the locked state, the brake assembly retards rotation of the drive member relative to the rotating member and, in the unlocked state, the brake assembly does not retard rotation of the drive member.

27. The propulsion system of claim 23, wherein the rotating member has a first rotational speed, the drive member a second rotational speed, and the gyroscope in a selected drive member a third rotational speed, and wherein the first, second, and third rotational speeds are different from one another.

* * * * *